(12) United States Patent
Ribeiro

(10) Patent No.: US 6,454,250 B1
(45) Date of Patent: Sep. 24, 2002

(54) SHOCK ABSORBING APPARATUS

(75) Inventor: Durval S. Ribeiro, Owatonna, MN (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 09/702,801

(22) Filed: Nov. 1, 2000

Related U.S. Application Data

(60) Provisional application No. 60/240,817, filed on Oct. 17, 2000, and provisional application No. 60/240,819, filed on Oct. 17, 2000.

(51) Int. Cl.$^7$ .................................................. F16F 7/00
(52) U.S. Cl. ........................ 267/141; 267/219; 248/615; 248/638; 361/683
(58) Field of Search ............................. 267/141, 141.2, 267/219; 248/581, 605, 615, 632, 634, 638; 361/685, 752, 796, 683; 174/52.1, 54

(56) References Cited

U.S. PATENT DOCUMENTS

| | | | |
|---|---|---|---|
| 5,530,068 A | | 6/1996 | Coolbaugh et al. ......... 525/314 |
| 5,550,712 A | * | 8/1996 | Crockett .................... 174/52.1 |
| 5,673,171 A | * | 9/1997 | Varghese et al. ............ 248/615 |
| 5,867,369 A | | 2/1999 | Antonuccio et al. ........ 361/796 |
| 6,271,604 B1 | * | 8/2001 | Frank et al. ................. 307/112 |
| 6,320,744 B1 | * | 11/2001 | Sullivan et al. .......... 312/223.2 |
| 6,324,054 B1 | * | 11/2001 | Chee et al. ................. 248/635 |

* cited by examiner

*Primary Examiner*—Pam Rodriguez
(74) *Attorney, Agent, or Firm*—Baker & Hostetler LLP

(57) ABSTRACT

A shock absorbing keypad and shock absorbing gasket for use in connection with a portable computing device.

23 Claims, 5 Drawing Sheets

SHOCK ABSORBING APPARATUS

This application claims priority from provisional patent application Ser. No. 60/240,817 entitled, "Hip Shock Mount" and provisional patent application Ser. No. 60/240,819 entitled "Shock Absorbing Key Pad", both filed Oct. 17, 2000, the entire contents of which are herein incorporated by reference.

FIELD OF THE INVENTION

The present invention relates generally to shock absorbers for preventing damage to a component housing. More particularly, the invention relates to shock absorbers for use in electronic devices for testing automobiles.

BACKGROUND OF THE INVENTION

In computing devices, such as personal computers, main frames, lap top computers, pocket PC's, personal digital assistants, portable analog or digital analyzers, and the like, there is a need for portable components that the primary user may use to connect to on-board computer monitoring systems such as those located in automobiles. These portable components are designed to eliminate the need for connecting wires and other related peripheral devices such as a mouse, a printer, a display, a modem, or a disk drive, or other peripheral plug in devices. These peripheral devices are especially prone to failure or damage due to dust, dirt, oil or grease or other hazards located in an automotive repair shop. In addition, the electronic components themselves are prone to shock damage as well.

U.S. Pat. No. 5,867,369 to Antonuccio et al., describes computer housing that protects electronic components from shock and vibration. In general, this patent describes the influences that sudden shock may have on the various computer components, particularly the disk drives. Here the computer system is protected by a housing that resists flexion and thereby protects electronic components from damage. However, such a system is not ideal for automotive repair shop usage due to its size.

Thus, despite the advantages that a portable testing device may offer, such components themselves may be prone to damage, particularly due to component housing breakage if the component housing is not capable of withstanding a drop from a workbench or from tools hitting the portable component. In light of the foregoing, there is a need for a shock protection that will provide resistance to external shocks that cause component housing breakage and/or electronic component damage.

SUMMARY OF THE INVENTION

The foregoing need for a mechanism for providing resistance to external impacts is satisfied to a great extent by the present invention which utilizes a shock absorbing keypad and an elastomeric member that acts as a shock absorber both of which prevent damage to a component housing. These shock absorbing elements provide the advantage of preventing damage to the component housing and internal components.

Additional features and advantages of the invention will be set forth in the description which follows, and in part will be apparent from the description, or may be learned from the practice of the invention. The objectives and other advantages of the invention will be realized and attained by the apparatus particularly pointed out in the written description and the claims hereof as well as the appended drawings.

To achieve these and other advantages and in accordance with the purpose of the invention, as embodied and broadly described, in one aspect of the invention an elastomeric keypad is provided having a spherical projection extending from the back surface. The spherical member abuts a circuit board on one side and the circuit board is supported on an opposite side by a post secured to the device frame.

In another aspect of the invention, an elastomeric member comprising a top face surface is provided, this top face surface is contactable with a bottom edge of a top housing component, a bottom face surface, the bottom face surface is contactable with a top edge of a bottom housing component, an exterior face surface, an interior face surface, a plurality of runners, the plurality of runners extending inward from the interior face surface and a plurality of washers, the plurality of washers located at the interior terminus of the plurality of runners.

In another aspect of the invention, the elastomeric member is constructed from rubber, synthetic rubber, latex, isoprene, butadiene, santoprene, eurothene, neoprene, or cork.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
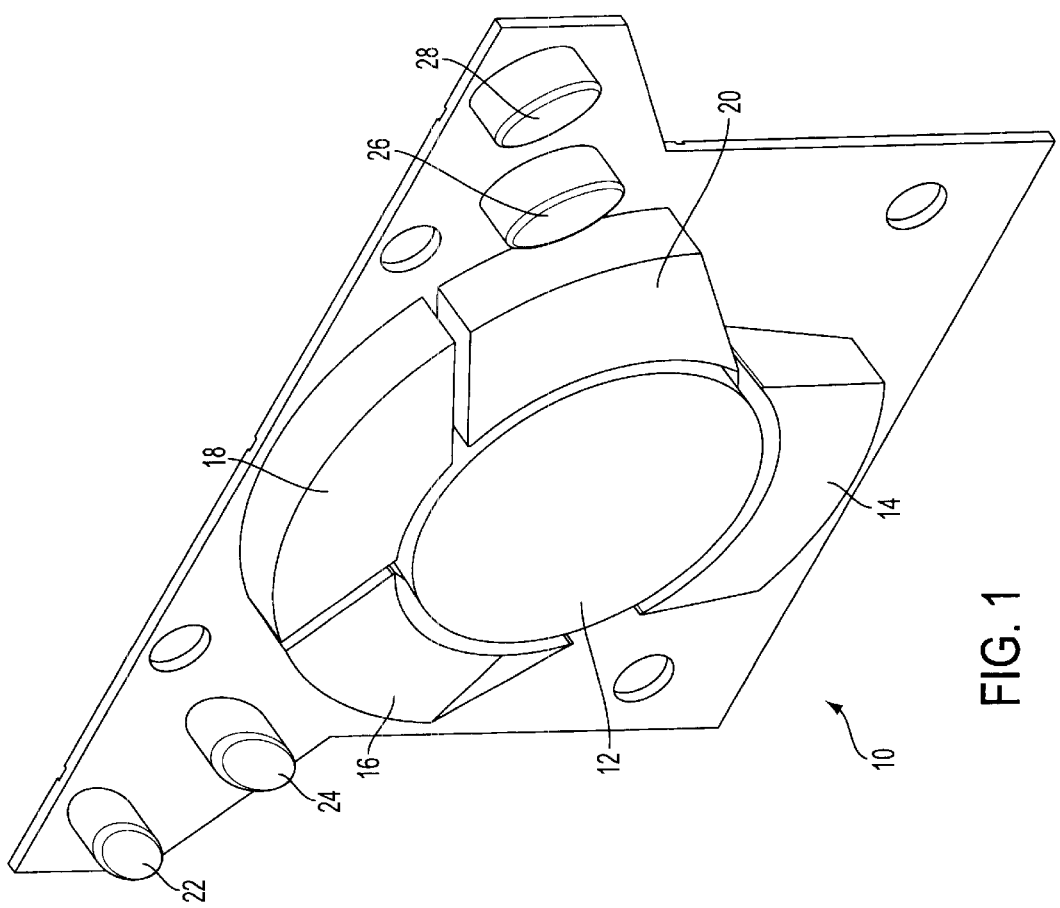
FIG. 1 is a perspective view of a shock absorbing keypad of the present invention.

Referring now to the figures, wherein like reference numerals indicate like elements, in FIG. 1 there is shown a shock absorbing keypad 10 for use in connection with a digital testing device. The keypad has a large cursor or directional key 12 in its center which can be used to move a command bar on the portable testing device display screen—left, up, right or down. The cursor key 12 which is made of an elastomeric material, is constructed to be used in providing shock absorbency for the cursor key when hit with force.

Four function keys 14, 16, 18, and 20 are provided adjacent the cursor key 12 on the key pad 10. Each function key 14, 16, 18, and 20 activates a different function performed by the testing device. In a preferred embodiment these keys provide the functions of exit 14, help 16, enter 18, and menu 20, on the digital testing device. A second series of function keys 22, 24, 26, and 28 are also provided to activate different software functions displayed on the digital testing device. The functions activated by the function keys 22, 24, 26, and 28 are determined by the software program operating on the digital testing device.

Figure 2:
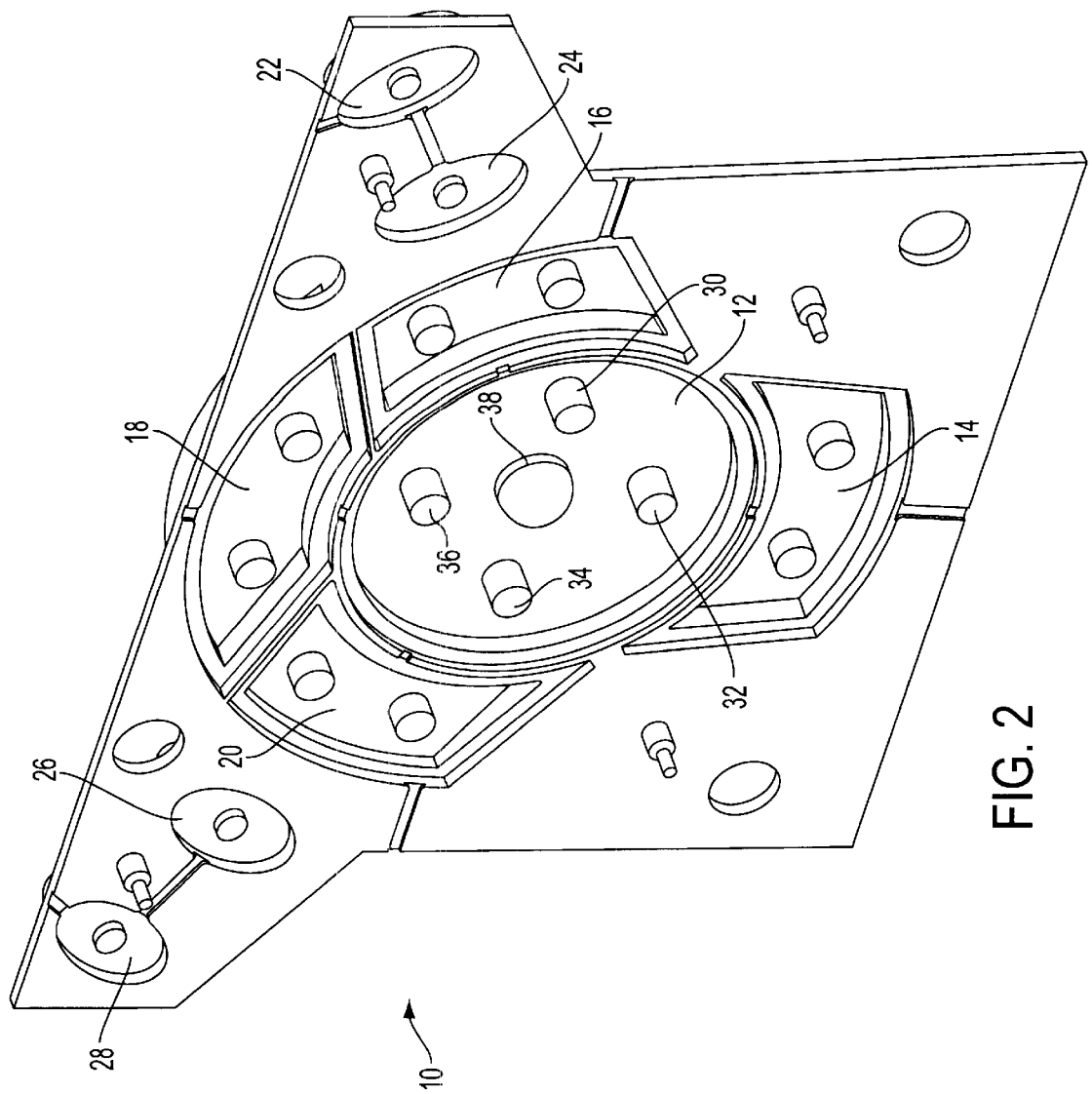
FIG. 2 is a perspective view of the back side of the shock absorbing keypad of FIG. 1.

FIG. 2 shows the back side of the shock absorbing keypad 10 of FIG. 1. Four projections 30, 32, 34, and 36 are provided on the back of the cursor key 12. Each projection is positioned to contact a switch on a keyboard so that when the cursor key is depressed over one of the four projections 30, 32, 34, and 36 a different switch on the keyboard is depressed moving the cursor left, up, right or down. Two projections are also provided behind each of the function keys 14, 16, 18, and 20 and one projection behind each of the function keys 22, 24, 26, and 28. The two projections behind each function key 14, 16, 18, and 20 are positioned to contact two different switches on the circuit board which can be connected to provide the same function or two different functions. The projection behind each of the function keys 22, 24, 26, and 28 are positioned above a single switch on the circuit board.

Figure 3:
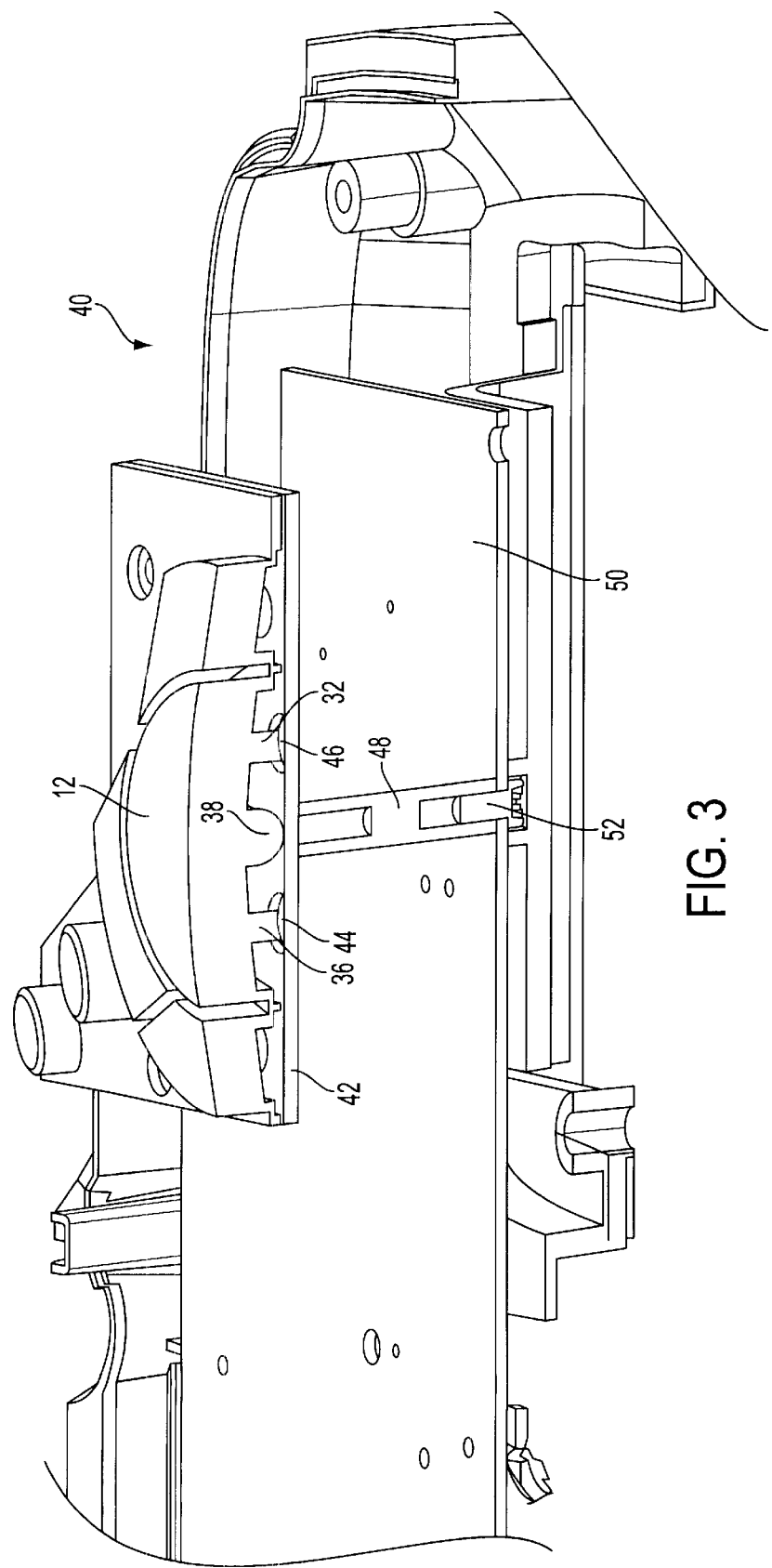
FIG. 3 is a cross-sectional perspective view of a digital testing device including the shock absorbing mechanism of a preferred embodiment of the present invention.

The cursor key 12 is also provided with a spherical projection 38 which is used in providing the shock absorbing functionality of the keypad 10. The mechanism for providing the shock absorbing functionality will now be described in connection with FIG. 3 which is a cross-sectional view of a digital analyzer 40 showing its various parts in relation to the shock absorbing keypad 10. The keypad 10 is situated above the circuit board 42 so that the projections 36 and 32 contact switches 44 and 46, respectively. The spherical projection 38 contacts the circuit 42 above a post 48. The post 48, which can be made from aluminum, steel or other rigid material, is fixed to the main printed circuit board 50 of the digital analyzer by a screw 52.

It will be readily understood by those skilled in the art that, in this configuration, when the screw is so positioned fixing the post to the main printed circuit board, a force applied to the keypad 10 will be distributed more uniformly thereby reducing the capability for damage to the digital analyzer 40.

In another embodiment of this invention the spherical projection positioned on the undersurface of the keypad can be conical and can be positioned in a different position under the cursor key for allowing a different distribution of force on impact from the keypad 10 being hit. In a preferred embodiment, the post 48 is centrally located beneath the cursor key 12.

Figure 4:
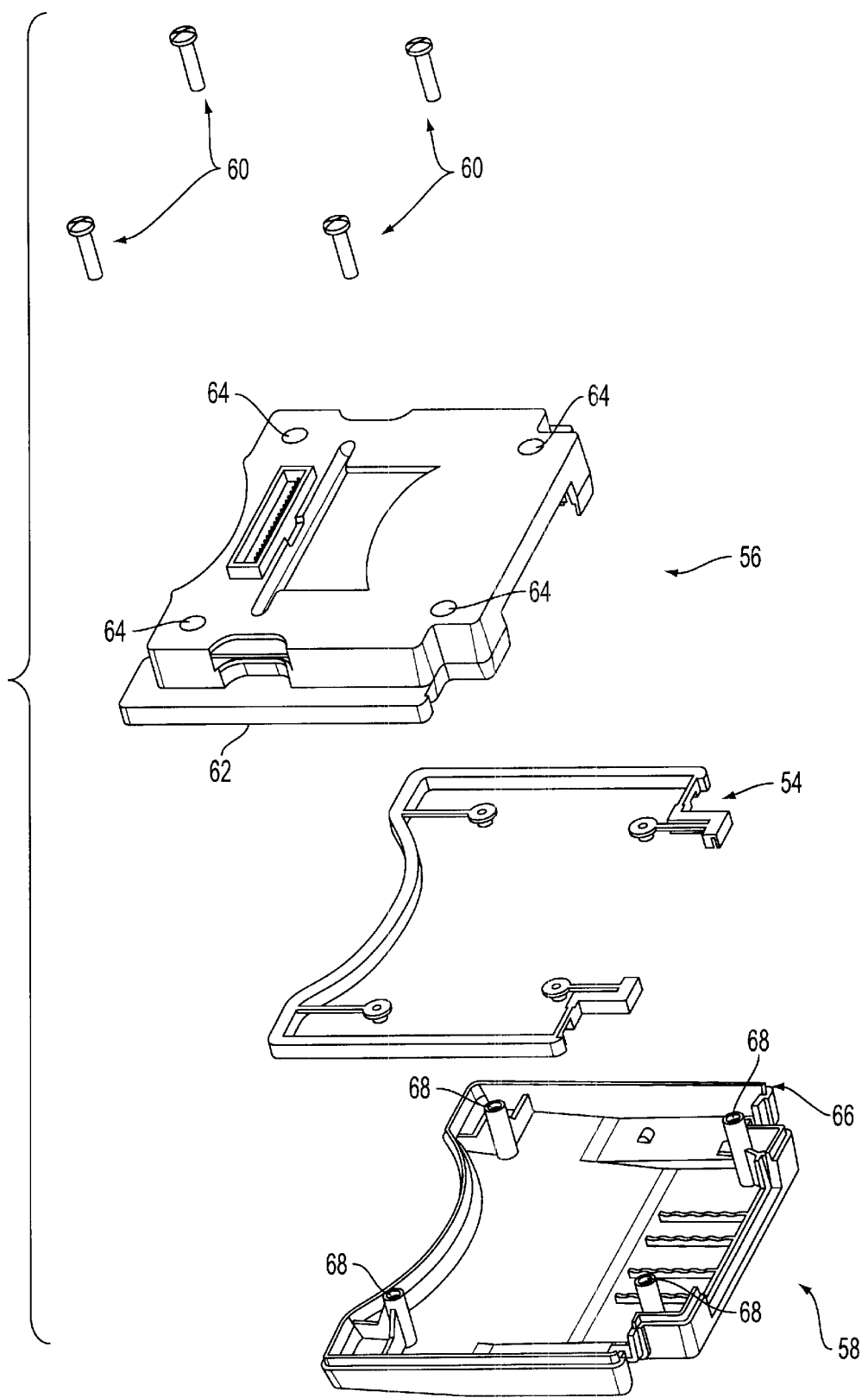
FIG. 4 is an exploded perspective view of a device incorporating a shock absorber of a preferred embodiment of the present invention.

Referring to FIG. 4, an elastomeric member 54 is formed to mate with the edges of a casing for an electronic component and thereby act as a shock absorber. The electronic component has a bottom casing 56 and a top casing 58 with the elastomeric member 54 located in between two. The bottom and top casings are held together by four screws 60 which attach the bottom casing 56 to the top casing 58 through the elastomeric member 54. The bottom casing 56 has a bottom edge 62 and screw receptacles 64. The bottom component has a top edge 66 and screw receptacles 68.

Figure 5:
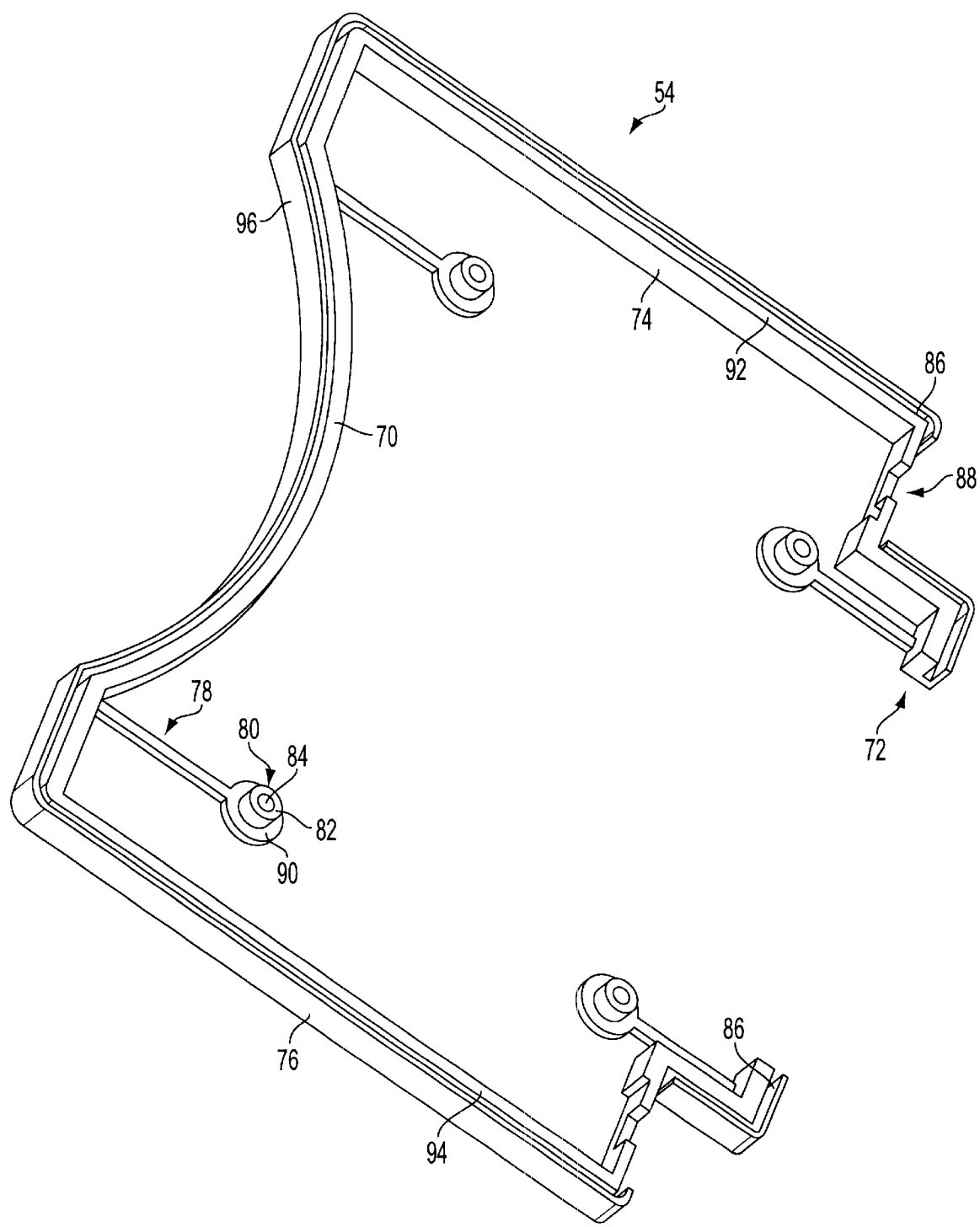
FIG. 5 is a perspective view of an elastomeric member of a preferred embodiment of the present invention.

Referring now to FIG. 5, the elastomeric member 54 may be formed in any shape that conforms to the general shape or pattern of the top and bottom halves of the housing component. The elastomeric member 54 or gasket has a top surface face 70, a bottom surface face 72, a interior surface face 74 and a exterior surface face 76. The elastomeric member also has runners 78 that extend from the interior surface face 74 about 2–5 cm and end in a washer 80. The washer has a post 82 which fits into the receptacles 68 that receives the screws 60 (see FIG. 4). The screws themselves pass through the washer 80 and receptacle post via a passage way 84 that traverse through the center of the washer and receptacle post. The elastomeric member as seen in FIG. 4 and FIG. 5 is oriented to mate with the top edge 66 of the bottom housing component. In this orientation the assembly groove 86 extends completely around the top surface face. The elastomeric member has an alignment notch 88 that aids in positioning the elastomeric member in the correct position to mate up with the top surface face of the bottom housing component.

Groove 86 is 0.127 inches deep and 0.047 inches wide on all sides. The washers 82 are 0.195 inches in diameter and 0.100 inch thick with a shoulder width 90 of 0.345 inches by 0.050 inches thick. The diameter of the screw hole passage 84 is 0.100 inches. The top surface 70 of the gasket is 0.186 inches with an exterior surface width of 0.185 inches.

The left and right side pieces 92, 94 are 04.449 inches long along the outer face 76. The width between the two side pieces 92, 94 is 6.261 inches long. The rear piece 96 has an arc section having a radius of 3.385 inches and a width between the arc terminal points of 4.20 inches.

The distance from the center of the rear left washer screw passage to the center of the rear right washer screw passage is 4.20 inches. The distance between the center of the front right washer screw passage and the front left washer screw passage is 3.6 inches. The distance from the center of the front screw passages to the center of the rear screw passages is 2.224 inches.

Elastomers (or rubbers) of either natural or synthetic origin are vulcanized to create insoluble, non-deformable high strength elastomeric products. Rubbers that are not vulcanized are generally inferior and have low strength which limit their utility. There are a number of synthetic elastomers that are based on polymers or copolymers of butadiene or isoprene. These synthetic elastomers are well known in the art and are generally described in U.S, Pat. No. 5,530,068 to Coolbaugh, et al., herein incorporated by reference in its entirety. Some examples of materials that can be used for the elastomeric materials of the present invention include rubber, synthetic rubber, latex, isoprene, butadiene, santoprene, eurothene, neoprene, or cork.

The foregoing shock absorbing mechanisms can be used in connection with a computer apparatus such as that described in the co-pending U.S. patent application Ser. No. 09/702,750, entitled "Plug-In Module for Portable Computing Device," by Durval Ribeiro and Kurt Raichle, which is hereby incorporated herein by reference.

The above description and drawings are only illustrative of preferred embodiments which achieve the objects, features, and advantages of the present invention, and it is not intended that the present invention be limited thereto.

Any modification of the present invention which comes within the spirit and scope of the following claims is considered to be part of the present invention.

What is claimed is:

1. An elastomeric member which absorbs a force between a top housing component and a bottom housing component, comprising:
   (a) a top face surface, said top face surface being contactable with a bottom edge of the top housing component;
   (b) a bottom face surface, said bottom face surface being contactable with a top edge of the bottom housing component;
   (c) an exterior face surface;
   (d) an interior face surface;
   (e) a plurality of runners, said plurality of runners extending inward from the interior face surface; and
   (f) a plurality of washers, said plurality of washers located at an interior terminus of said plurality of runners.

2. The elastomeric member according to claim 1, wherein said elastomeric member further comprises an assembly groove.

3. The assembly groove according to claim 2, wherein said assembly groove forms a channel in the top face surface.

4. The assembly groove according to claim 3, wherein said top face surface channel further comprises at least one alignment notch.

5. The assembly groove according to claim 3, wherein said top face surface channel is molded to accept a bottom edge of a top housing component.

6. The assembly groove according to claim 2, wherein said assembly groove forms a channel in the bottom face surface.

7. The assembly groove according to claim 6, wherein said bottom face surface channel further comprises at least one alignment notch.

8. The assembly groove according to claim 3, wherein said bottom face surface channel is molded to accept a top edge of a bottom housing component.

9. The elastomeric member according to claim 1, wherein said member is constructed from a material selected from the group consisting of rubber, synthetic rubber, latex, isoprene, butadiene, santoprene, eurothene, neoprene, and cork.

10. A shock absorbing apparatus which absorbs a force applied to an electronic component of a computer apparatus, the electronic component having an upper casing and a lower casing, and a shock absorbing apparatus comprising:
   an elastomeric member having an interior face surface, said elastomeric member disposed between the upper casing and the lower casing of the electronic component, said elastomeric member being formed of a similar shape as that of the upper casing and the lower casing, and oriented to mate with edges of the upper casing and edges of the lower casing, said elastomeric member having a plurality of runners, said plurality of runners extending inward from the interior face surface; and
   a mechanism to hold the upper casing and the lower casing together via said elastomeric member.

11. The shock absorbing apparatus according to claim 10, wherein said elastomeric member further comprises a plurality of extensions extending from said elastomeric member and disposed between the upper casing and the lower casing, said extensions having washers disposed at one end, and said washers having posts which fit into receptacles on the upper casing and on the lower casing of the electronic component.

12. The shock absorbing apparatus according to claim 11, wherein said holding mechanism comprises a plurality of screws formed to be inserted into said receptacles.

13. The shock absorbing apparatus according to claim 12, wherein said elastomeric member comprises:
   a top surface;
   a bottom surface;
   an interior surface;
   an exterior surface; and
   an assembly groove extending around the top surface.

14. The shock absorbing apparatus of claim 13, further comprising an alignment notch disposed on said elastomeric member, which aids in positioning the elastomeric member between the upper casing and the lower casing.

15. The shock absorbing apparatus of claim 14, wherein said elastomeric member is substantially rectangular in shape.

16. The shock absorbing apparatus of claim 10, wherein said elastomeric member is one of a natural and synthetic elastomer.

17. A shock absorbing apparatus which absorbs a force applied to an electronic component of a computer apparatus, the electronic component having an upper casing and a lower casing, said shock absorbing apparatus comprising:
   means for absorbing the force between the upper casing and the lower casing, said absorbing means being disposed between the upper casing and the lower casing of the electronic component, said means further having an interior face surface and a plurality of runners extending inward from said interior face surface; and
   means for holding the upper casing and the lower casing together via said means for absorbing.

18. The shock absorbing apparatus according to claim 17, wherein said absorbing means are formed of a similar shape as that of the upper casing and the lower casing, and said absorbing means are oriented to mate with edges of the upper casing and edges of the lower casing.

19. The shock absorbing apparatus according to claim 18, wherein said absorbing means comprises an elastomeric member having a plurality of extensions extending therefrom and disposed between the upper casing and the lower casing, said extensions having washers disposed at one end, and said washers having posts which fit into receptacles on the upper casing and on the lower casing of the electronic component.

20. The shock absorbing apparatus according to claim 19, wherein said holding mechanism comprises a plurality of screws formed to be inserted into said receptacles.

21. A method of absorbing shock from a force applied to an electronic component of a computer apparatus, the electronic component having an upper casing and a lower casing, the method comprising:
   placing an elastomeric compound having an interior face surface between the upper casing and the lower casing such that the edges of the upper casing and the lower casing coincide with each other and said elastomeric compound;
   inserting a holding mechanism through a plurality of runners extending inward from the interior face surface into receptacles disposed in the upper casing and the lower casing to hold the upper casing and lower casing together with said elastomeric compound.

22. The method of absorbing shock according to claim 21, further comprising the step of aligning the upper casing and the lower casing using a notch disposed on said elastomeric member.

23. A shock absorbing apparatus which absorbs a force applied to an electronic component of a computer apparatus, the electronic component having an upper casing and a lower casing, said shock absorbing apparatus comprising:

an elastomeric member disposed between the upper casing and the lower casing of the electronic component, said elastomeric member being formed of a similar shape as that of the upper casing and the lower casing, and oriented to mate with edges of the upper casing and edges of the lower casing, wherein said elastomeric member further comprises a plurality of extensions extending from the elastomeric member and disposed between the upper casing and the lower casing, said extensions having washers exposed at one end, and said washers having posts which fit into receptacles on the upper and on the lower casing of the electronic component; and a mechanism to hold the upper casing and the lower casing together via said elastomeric member.

* * * * *